US012431272B2

(12) United States Patent
Yen

(10) Patent No.: US 12,431,272 B2

(45) Date of Patent: Sep. 30, 2025

(54) INDUCTOR DEVICE

(71) Applicant: Realtek Semiconductor Corporation, Hsinchu (TW)

(72) Inventor: Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 912 days.

(21) Appl. No.: 17/645,959

(22) Filed: Dec. 23, 2021

(65) Prior Publication Data

US 2023/0027844 A1 Jan. 26, 2023

(30) Foreign Application Priority Data

Jul. 20, 2021 (TW) ................................ 110126602

(51) Int. Cl.

*H01F 27/28* (2006.01)
*H01F 17/00* (2006.01)
*H01F 27/29* (2006.01)

(52) U.S. Cl.

CPC ......... *H01F 17/0013* (2013.01); *H01F 27/29* (2013.01); *H01F 2017/004* (2013.01); *H01F 2017/0073* (2013.01)

(58) Field of Classification Search

CPC ................. H01F 17/0013; H01F 27/29; H01F 2017/004; H01F 2017/0073; H01F 2017/0046; H01F 17/0006

USPC .......................................... 336/70, 200, 192

See application file for complete search history.

(56) References Cited

U.S. PATENT DOCUMENTS

| | | | | |
|---|---|---|---|---|
| 10,153,078 | B2 | 12/2018 | Yen et al. | |
| 2011/0148733 | A1 | 6/2011 | Fahs et al. | |
| 2012/0044034 | A1* | 2/2012 | Nazarian | H10D 1/20 336/200 |
| 2019/0148479 | A1* | 5/2019 | Yen | H01F 17/0006 336/173 |
| 2019/0279809 | A1* | 9/2019 | Yen | H01F 17/0006 |
| 2020/0312511 | A1 | 10/2020 | Yen et al. | |
| 2020/0312512 | A1 | 10/2020 | Yen et al. | |
| 2020/0312521 | A1 | 10/2020 | Yen et al. | |
| 2020/0312524 | A1 | 10/2020 | Yen et al. | |
| 2020/0312530 | A1 | 10/2020 | Yen et al. | |

* cited by examiner

*Primary Examiner* — Shawki S Ismail
*Assistant Examiner* — Kazi S Hossain
(74) *Attorney, Agent, or Firm* — CKC & Partners Co., LLC

(57) ABSTRACT

An inductor device includes a first trace, a second trace, a first connection member, and a second connection member. The first trace includes a first sub-trace and a second sub-trace. The second sub-trace is disposed adjacent to the first sub-trace directly. The second trace includes a third sub-trace. The third sub-trace is disposed adjacent to the second sub-trace directly. The first connection member is configured to couple to the first sub-trace. The second connection member is disposed adjacent to the first connection member, and configured to couple to the second sub-trace.

6 Claims, 4 Drawing Sheets

INDUCTOR DEVICE

RELATED APPLICATIONS

This application claims priority to and the benefit of Taiwan Application Serial Number 110126602, filed on Jul. 20, 2021, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

The various types of inductors according to the prior art have their advantages and disadvantages. For example, a spiral inductor has a higher Q value and a larger mutual inductance. However, coupling is occurred between a spiral inductor and other devices. For an eight-shaped inductor which has two sets of coils, the coupling between the two sets of coils is relatively low. However, an eight-shaped inductor occupies a larger area in a device. In addition, it is hard to design a twin inductor to be a symmetrical structure, which is formed with two inductors combined together, and the terminal of the twin inductor shall be disposed at a specific position. Therefore, the scopes of application of the above inductors are limited.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device which comprises a first trace, a second trace, a first connection member, and a second connection member. The first trace comprises a first sub-trace and a second sub-trace. The second sub-trace is disposed adjacent to the first sub-trace directly. The second trace comprises a third sub-trace. The third sub-trace is disposed adjacent to the second sub-trace directly. The first connection member is configured to couple to the first sub-trace. The second connection member is disposed adjacent to the first connection member, and configured to couple to the second sub-trace.

Therefore, based on the technical content of the present disclosure, since the first sub-trace and the second sub-trace of the first trace of the inductor device of the present disclosure are disposed directly adjacent to each other, the capacitance therebetween is efficiently decreased. In addition, the disposition of the inductor device of the present disclosure can enhance the quality factor (Q factor).

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
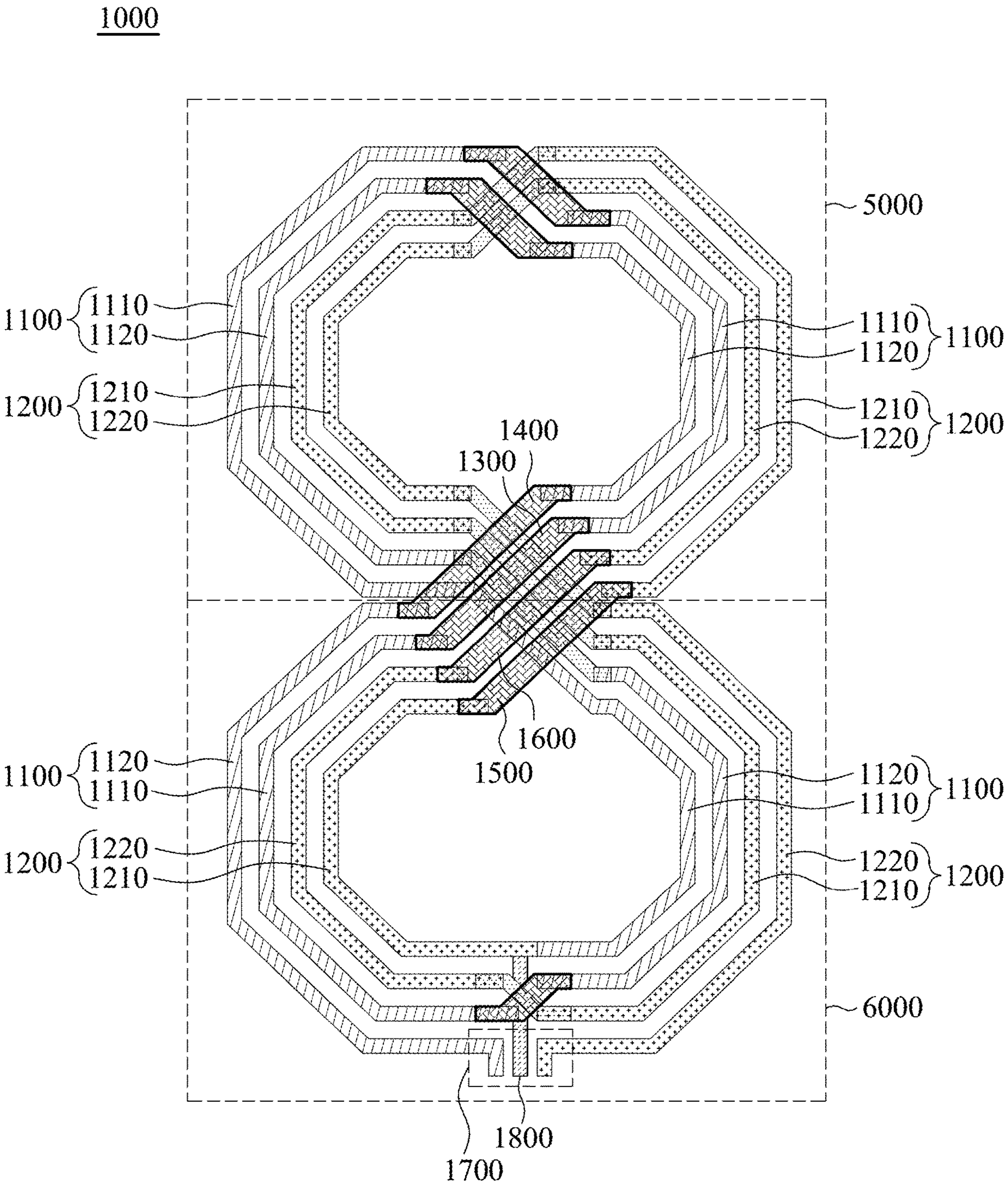
FIG. 1 depicts a schematic diagram of an inductor device according to one embodiment of the present disclosure.

FIG. 1 depicts a schematic diagram of an inductor device 1000 according to one embodiment of the present disclosure. As shown in the FIG. 1, the inductor device 1000 includes a first trace 1100, a second trace 1200, a first connection member 1300, and a second connection member 1400. The first trace 1100 includes a first sub-trace 1110 and a second sub-trace 1120. The second trace 1200 includes a third sub-trace 1210.

With respect to structures, the first sub-trace 1110 is disposed directly adjacent to the second sub-trace 1120. The second sub-trace 1120 is disposed directly adjacent to the third sub-trace 1210. In addition, the first connection member 1300 is configured to couple to the first sub-trace 1110. The second connection member 1400 is disposed adjacent to the first connection member 1300, and configured to couple to the second sub-trace 1120. Since the first sub-trace 1110 and the second sub-trace 1120 of the first trace 1100 of the present disclosure are disposed directly adjacent to each other, the capacitance therebetween is efficiently decreased.

In one embodiment, the second trace 1200 further includes a fourth sub-trace 1220, and the fourth sub-trace 1220 is disposed directly adjacent to the third sub-trace 1210. Since the third sub-trace 1210 and the fourth sub-trace 1220 of the second trace 1200 of the present disclosure are disposed directly adjacent to each other, the capacitance therebetween is efficiently decreased. It is noted that, the above-mentioned two sub-traces being disposed "directly adjacent to each other" means that the two sub-traces are disposed parallel to each other and there is no sub-trace which is disposed between the two sub-traces.

In another embodiment, at the first side of the first area 5000 (e.g. the left side of the upper half area in the FIG. 1), the first sub-trace 1110 and the second sub-trace 1120 are disposed at the outer side of the inductor device 1000, and the third sub-trace 1210 and the fourth sub-trace 1220 are disposed at the inner side of the inductor device 1000. In one embodiment, at the first side of the first area 5000 (e.g. the left side of the upper half area in the FIG. 1), the disposition manner of sub-traces is that the first sub-trace 1110, the second sub-trace 1120, the third sub-trace 1210, and the fourth sub-trace 1220.

In one embodiment, at the second side of the first area 5000 (e.g. the right side of the upper half area in the FIG. 1), the first sub-trace 1110 and the second sub-trace 1120 are disposed at the inner side of the inductor device 1000, and the third sub-trace 1210 and the fourth sub-trace 1220 are disposed at the outer side of the inductor device 1000. In addition, the first side of the first area 5000 is corresponding to the second side (e.g. the left side and the right side of the upper half area in the FIG. 1 are opposite to each other). In another embodiment, the second side of the first area 5000 (e.g. the right side of the upper half area in the FIG. 1), the disposition manner of the sub-trace is that the second sub-trace 1120, the first sub-trace 1110, the fourth sub-trace 1220, and the third sub-trace 1210.

In another embodiment, at the third side of the second area 6000 (e.g. the left side of the lower half area in the FIG. 1), the first sub-trace 1110 and the second sub-trace 1120 are disposed at the outer side of the inductor device 1000, and the third sub-trace 1210 and the fourth sub-trace 1220 are disposed at the inner side of the inductor device 1000. In one embodiment, at the third side of the second area 6000 (e.g. the left side of the lower half area in the FIG. 1), the disposition manner of the sub-trace is that the second sub-trace 1120, the first sub-trace 1110, the fourth sub-trace 1220, and the third sub-trace 1210.

In one embodiment, at the fourth side of the second area 6000 (e.g. the right side of the lower half area in the FIG. 1), the first sub-trace 1110 and the second sub-trace 1120 are disposed at the inner side of the inductor device 1000, and the third sub-trace 1210 and the fourth sub-trace 1220 are disposed at the outer side of the inductor device 1200. In addition, the first area 5000 is adjacent to the second area 6000 (e.g. the upper half area and the lower half area in the FIG. 1 are adjacent to each other), and the third side of the second area 6000 is corresponding to the fourth side (e.g. the left side and the right side are of the lower half area in the FIG. 1 are opposite to each other). In another embodiment, at the fourth side of the second area 6000 (e.g. the right side of the lower half area in the FIG. 1), the disposition manner of the sub-trace is that the first sub-trace 1110, the second sub-trace 1120, the third sub-trace 1210, and the fourth sub-trace 1220.

Referring to FIG. 1, the inductor device 1000 further includes a third connection member 1500 and a fourth connection member 1600. The third connection member 1500 is configured to couple to the third sub-trace 1210. The fourth connection member 1600 is disposed directly adjacent to the third connection member 1500 and the first connection member 1300, and configured to couple to the fourth sub-trace 1220. In addition, the first connection member 1300 is disposed directly adjacent to the second connection member 1400. It is noted that, the above-mentioned two connection members being disposed "directly adjacent to each other" means that the two connection members are disposed parallel to each other and there is no connection member which is disposed between the two connection members. In one embodiment, the disposition manner of the connection member is that the second connection member 1400, the first connection member 1300, the fourth connection member 1600, and the third connection member 1500.

In one embodiment, the first sub-trace 1110, the second sub-trace 1120, the third sub-trace 1210, and the fourth sub-trace 1220 are located on the first layer. In addition, the first connection member 1300, the second connection member 1400, the third connection member 1500, and the fourth connection member 1600 are located on the second layer. The first layer and the second layer are located on different layers.

In another embodiment, the inductor device 1000 of the present disclosure further includes an input/output terminal 1700 and a center-tapped terminal 1800. The input/output terminal 1700 and the center-tapped terminal 1800 can be disposed at the same side (e.g. the lower side of the second area 6000 in the FIG. 1). In addition, the center-tapped terminal 1800 can extend from the inner side of the third sub-trace 1210 to the outer side. It is noted that the present disclosure is not limited to the structure as shown in FIG. 1, and it is merely an example for illustrating one of the implements of the present disclosure.

Figure 2:
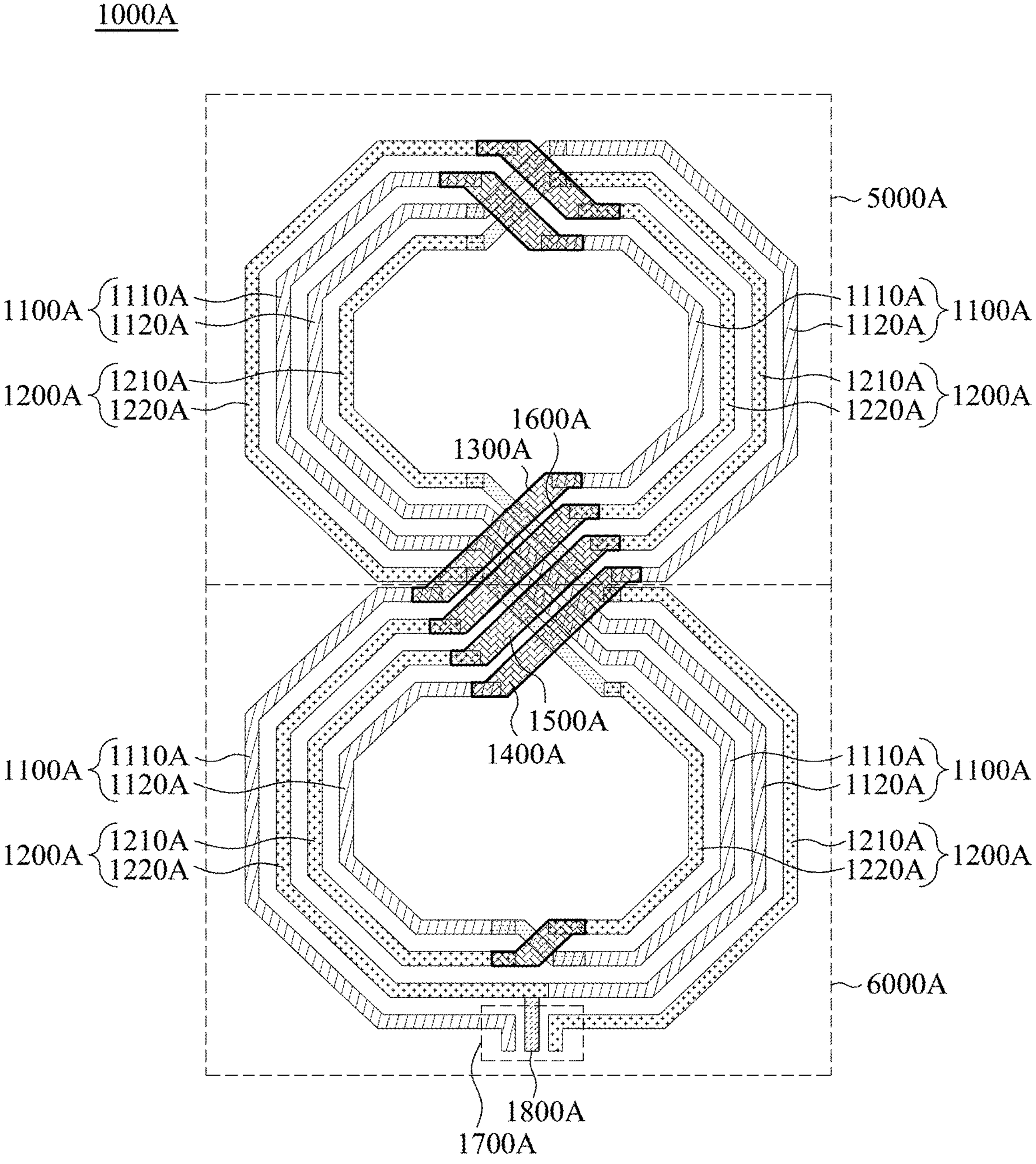
FIG. 2 depicts a schematic diagram of an inductor device according to one embodiment of the present disclosure.

FIG. 2 depicts a schematic diagram of an inductor device 1000A according to one embodiment of the present disclosure. Compared with the inductor device 1000 in FIG. 1, the disposition of the inductor device 1000A in FIG. 2 is different, which will be described in detail as below.

Referring to FIG. 2, at the first side of the first area 5000A (e.g. the left side of the upper half area in the FIG. 2), the fourth sub-trace 1220A is disposed at the outer side of the inductor device 1000A, the third sub-trace 1210A is disposed at the inner side of the inductor device 1000A, and the first sub-trace 1110A and the second sub-trace 1120A are disposed between the third sub-trace 1210A and the fourth sub-trace 1220A. In one embodiment, at the first side of the first area 5000A (e.g. the left side of the upper half area in the FIG. 2), the disposition manner of the sub-trace is that the fourth sub-trace 1220A, the first sub-trace 1110A, the second sub-trace 1120A, and the third sub-trace 1210A. In one embodiment, the fourth sub-trace 1220A is disposed directly adjacent to the first sub-trace 1110A.

In one embodiment, at the second side of the first area 5000A (e.g. the right side of the upper half area in the FIG. 2), the first sub-trace 1110A is disposed at the inner side of the inductor device 1000A, the second sub-trace 1120A is disposed at the outer side of the inductor device 1000A, and the third sub-trace 1210A and the fourth sub-trace 1220A are disposed between the first sub-trace 1110A and the second sub-trace 1120A. In addition, the first side of the first area 5000A is corresponding to the second side (e.g. the left side and the right side of the upper half area in the FIG. 2 are opposite to each other). In another embodiment, at the second side of the first area 5000A (e.g. the right side of the upper half area in the FIG. 2), the disposition manner of the sub-trace is that the first sub-trace 1110A, the fourth sub-trace 1220A, the third sub-trace 1210A, and the second sub-trace 1120A.

In another embodiment, at the third side of the second area 6000A (e.g. the left side of the lower half area in the FIG. 2), the first sub-trace 1110A is disposed at the outer side of the inductor device 1000A, the second sub-trace 1120A is disposed at the inner side of the inductor device 1000A, and the third sub-trace 1210A and the fourth sub-trace 1220A are disposed between the first sub-trace 1110A and the second sub-trace 1120A.

In one embodiment, at the fourth side of the second area 6000A (e.g. the right side of the lower half area in the FIG. 2), the third sub-trace 1210A is disposed at the outer side of the inductor device 1000A, the fourth sub-trace 1220A is disposed at the inner side of the inductor device 1000A, and the first sub-trace 1110A and the second sub-trace 1120A are disposed between the third sub-trace 1210A and the fourth sub-trace 1220A. In addition, the first area 5000A is adjacent to the second area 6000A (e.g. the upper half area and the lower half area in the FIG. 2 are adjacent to each other), and the third side of the second area 6000A is corresponding to the fourth side (e.g. the left side and the right side of the lower half area in the FIG. 2 are opposite to each other). In another embodiment, at the fourth side of the second area 6000A (e.g. the right side of the lower half area in the FIG. 2), the disposition manner of the sub-trace is that the fourth sub-trace 1220A, the first sub-trace 1110A, the second sub-trace 1120A, and the third sub-trace 1210A.

Referring to FIG. 2, the inductor device 1000A further includes a third connection member 1500A and a fourth connection member 1600A. The third connection member 1500A is configured to couple to the third sub-trace 1210A. The fourth connection member 1600A is disposed directly adjacent to the third connection member 1500A, and configured to couple to the fourth sub-trace 1220A. It is noted that, the above-mentioned two connection members being disposed "directly adjacent to each other" means that the two connection members are disposed parallel to each other and there is no connection member which is disposed between the two connection members. In one embodiment, the disposition manner of the connection member is that the first connection member 1300A, the fourth connection member 1600A, the third connection member 1500A, and the second connection member 1400A.

In one embodiment, the first sub-trace 1110A, the second sub-trace 1120A, the third sub-trace 1210A, and the fourth sub-trace 1220A are located on the first layer. In addition, the first connection member 1300A, the second connection member 1400A, the third connection member 1500A, and the fourth connection member 1600A are located on the second layer. The first layer and the second layer are located on different layers.

In another embodiment, the inductor device 1000A of the present disclosure further includes an input/output terminal 1700A and a center-tapped terminal 1800A. The input/output terminal 1700A and the center-tapped terminal 1800A can be disposed at the same side (e.g. the lower side of the second area 6000A in the FIG. 2). In addition, the center-tapped terminal 1800A can extend from the outer side of the fourth sub-trace 1220A to the outside. It is noted that the present disclosure is not limited to the structure as shown in FIG. 2, and it is merely an example for illustrating one of the implements of the present disclosure.

Figure 3:
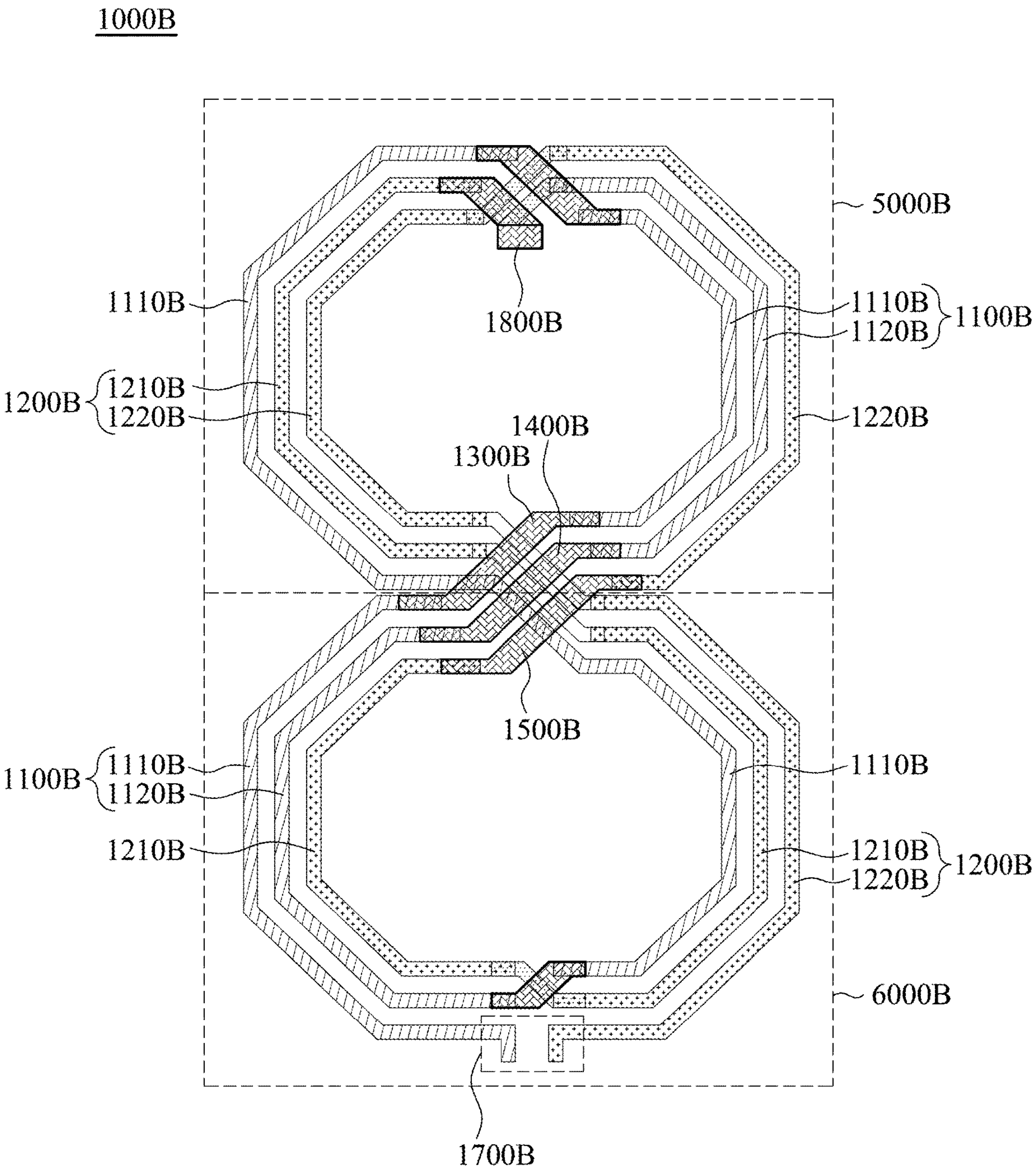
FIG. 3 depicts a schematic diagram of an inductor device according to one embodiment of the present disclosure.

FIG. 3 depicts a schematic diagram of an inductor device 1000B according to one embodiment of the present disclosure. Compared with the inductor device 1000 in FIG. 1, the disposition of the inductor device 10006 in FIG. 3 is different, which will be described in detail as below.

Referring to FIG. 3, at the first side of the first area 6000B (e.g. the left side of the lower half area in the FIG. 3), the first sub-trace 11106 and the second sub-trace 1120B are disposed at the outer side of the inductor device 1000B, and the third sub-trace 1210B is the disposed at the inner side of the inductor device 1000B. In one embodiment, at the first side of the first area 6000B (e.g. the left side of the lower half area in the FIG. 3), the disposition manner of the sub-trace is that the first sub-trace 11106, the second sub-trace 1120B, and the third sub-trace 1210B.

In addition, at the second side of the first area 6000B (e.g. the right side of the lower half area in the FIG. 3), the first sub-trace 11106 is disposed at the inner side of the inductor device 1000B, and the third sub-trace 1210B and the fourth sub-trace 12206 are disposed at the outer side of the inductor device 1000B. In one embodiment, at the second side of the first area 6000B (e.g. the right side of the lower half area in the FIG. 3), the disposition manner of the sub-trace is that the first sub-trace 11106, the third sub-trace 1210B, and the fourth sub-trace 1220B. In another embodiment, the fourth sub-trace 1220B is disposed directly adjacent to the third sub-trace 1210B.

In one embodiment, at the third side of the second area 5000B (e.g. the left side of the upper half area in the FIG. 3), the first sub-trace 11106 is disposed at the outer side of the inductor device 10006, and the third sub-trace 1210B and the fourth sub-trace 1220B are disposed at the inner side of the inductor device 1000B. In another embodiment, at the third side of the second area 5000B (e.g. the left side of the upper half area in the FIG. 3), the disposition manner of the sub-trace is that the first sub-trace 11106, the third sub-trace 1210B, and the fourth sub-trace 1220B.

In addition, at the fourth side of the second area 5000B (e.g. the right side of the upper half area in the FIG. 3), the first sub-trace 11106 and the second sub-trace 1120B are disposed at the inner side of the inductor device 1000B, and the fourth sub-trace 1220B is disposed at the outer side of the inductor device 1000B. In one embodiment, at the fourth side of the second area 5000B (e.g. the right side of the upper half area in the FIG. 3), the disposition manner of the sub-trace is that the first sub-trace 1110B, the second sub-trace 1120B, and the fourth sub-trace 1220B.

In another embodiment, the first side of the first area 6000B is corresponding to the second side (e.g. the left side and right side of the lower half area in the FIG. 3 are opposite to each other). In addition, the first area 6000B is adjacent to the second area 5000B (e.g. the lower half area and the upper half area in the FIG. 3 are adjacent to each other), and the third side of the second area 5000B is corresponding to the fourth side (e.g. the left side and the right side of the upper half area in the FIG. 3 are opposite to each other).

Referring to FIG. 3, the inductor device 1000B further includes a third connection member 1500B. The third connection member 1500B is configured to couple to the third sub-trace 1210B and the fourth sub-trace 1220B. The first connection member 1300B is disposed directly adjacent to the second connection member 1400B. In addition, the first sub-trace 1110B, the second sub-trace 1120B, the third sub-trace 1210B, and the fourth sub-trace 1220B are located on the first layer. Besides, the first connection member 1300B, the second connection member 1400B, and the third connection member 1500B are located on the second layer, and the first layer and the second layer are located on different layers.

In one embodiment, the inductor device 1000B of the present disclosure further includes an input/output terminal

1700B and a center-tapped terminal 1800B. The input/output terminal 1700B and the center-tapped terminal 1800B can be disposed at two opposite sides (e.g. the lower side of the first area 6000B and the upper side of the second area 5000B in the FIG. 3). In addition, the center-tapped terminal 1800B can be disposed at a junction formed by the second sub-trace 1120B and the third sub-trace 1210B of the second area 5000B. It is noted that the present disclosure is not limited to the structure as shown in FIG. 3, and it is merely an example for illustrating one of the implements of the present disclosure.

Figure 4:
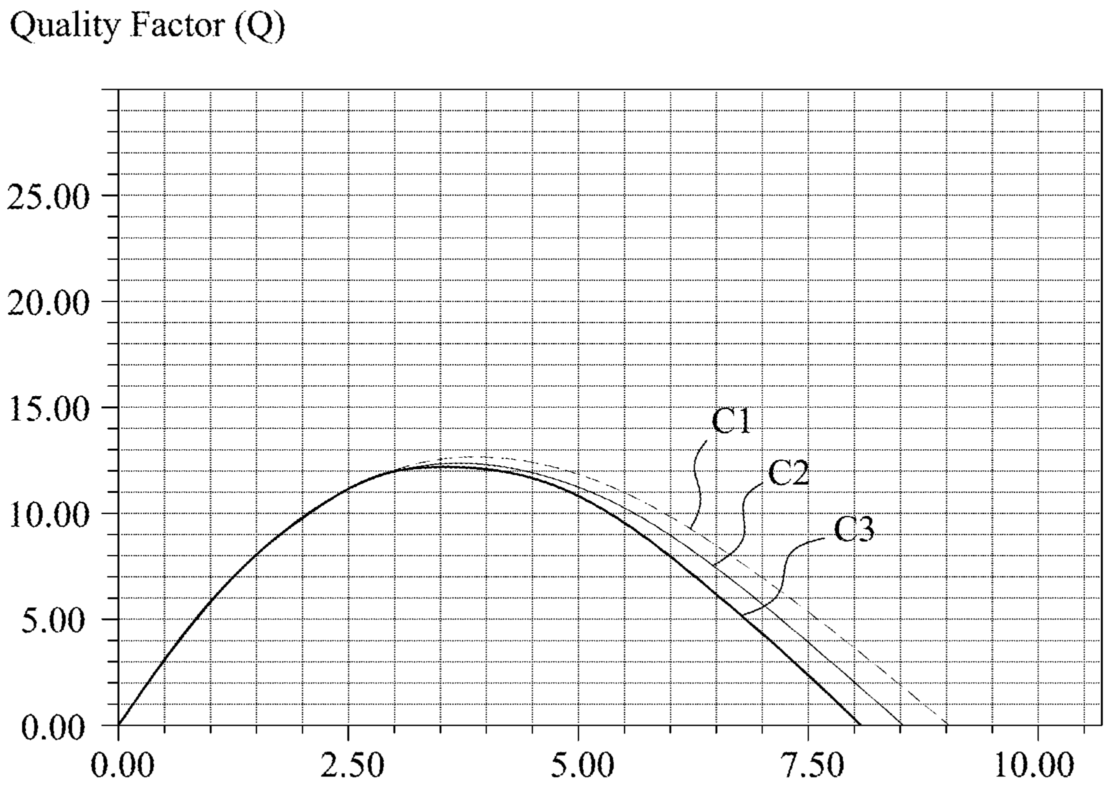
FIG. 4 depicts a schematic diagram of experimental data of an inductor device according to one embodiment of the present disclosure.

FIG. 4 depicts a schematic diagram of experimental data of an inductor device according to one embodiment of the present disclosure. As shown in the FIG. 4, the experimental curves of the quality factors of the inductor devices 1000, 1000A, 1000B in FIG. 1, FIG. 2 and FIG. 3 adopting the structural configuration of the present disclosure are C1, C2, C3. As shown in the FIG. 4, the inductor devices 1000, 1000A, 10006 in FIG. 1, FIG. 2 and FIG. 3 adopting the structural configuration of the present disclosure have better the quality factors. For example, at 3.5 GHz, the best quality factor is about 12.22.

It can be understood from the embodiments of the present disclosure that application of the present disclosure has the following advantages. Since part of the sub-traces of the inductor device of the present disclosure are disposed directly adjacent to each other, the capacitance therebetween is efficiently decreased. In addition, the disposition of the inductor device of the present disclosure can enhance the quality factor (Q factor).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first trace, comprising:

a first sub-trace; and a second sub-trace, disposed directly adjacent to the first sub-trace;

a second trace, comprising:

a third sub-trace, disposed directly adjacent to the second sub-trace; and a fourth sub-trace, disposed directly adjacent to the third sub-trace;

a first connection member, configured to couple to the first sub-trace;

a second connection member, disposed adjacent to the first connection member, and configured to couple to the second sub-trace;

a third connection member, configured to couple to the third sub-trace; and a fourth connection member, disposed directly adjacent to the third connection member and the first connection member, and configured to couple to the fourth sub-trace, wherein the first connection member is disposed directly adjacent to the second connection member;

wherein the first sub-trace, the second sub-trace, and the third sub-trace are located on a first layer, and the first connection member and the second connection member are located on a second layer, wherein the first layer and the second layer are different layers.

2. The inductor device of claim 1, wherein at a first side of a first area, the first sub-trace and the second sub-trace are disposed at an outer side of the inductor device, and the third sub-trace and the fourth sub-trace are disposed at an inner side of the inductor device.

3. The inductor device of claim 2, wherein at a second side of the first area, the first sub-trace and the second sub-trace are disposed at an inner side of the inductor device, and the third sub-trace and the fourth sub-trace are disposed at an outer side of the inductor device, wherein the first side is corresponding to the second side.

4. The inductor device of claim 3, wherein at a third side of a second area, the first sub-trace and the second sub-trace are disposed at an outer side of the inductor device, and the third sub-trace and the fourth sub-trace are disposed at an inner side of the inductor device.

5. The inductor device of claim 4, wherein at a fourth side of the second area, the first sub-trace and the second sub-trace are disposed at an inner side of the inductor device, and the third sub-trace and the fourth sub-trace are disposed at an outer side of the inductor device, wherein the first area is adjacent to the second area, and the third side is corresponding to the fourth side.

6. The inductor device of claim 1, wherein the fourth sub-trace is located on the first layer, and the third connection member and the fourth connection member are located on the second layer.

* * * * *